United States Patent [19]

Nakae et al.

[11] Patent Number: 5,527,879
[45] Date of Patent: Jun. 18, 1996

[54] POLYFUNCTIONAL POLYCARBONATE POLYOL

[75] Inventors: Yasuhiko Nakae, Sakai; Hisaki Tanabe, Yawata; Tadahiko Nishi, Suita; Yoshio Eguchi, Ikeda, all of Japan

[73] Assignee: Nippon Paint Co., Ltd., Osaka-fu, Japan

[21] Appl. No.: 36,247

[22] Filed: Mar. 24, 1993

[30] Foreign Application Priority Data

Mar. 24, 1992 [JP] Japan ................................. 4-065803
Aug. 26, 1992 [JP] Japan ................................. 4-227033

[51] Int. Cl.$^6$ ................................. C08G 63/62
[52] U.S. Cl. .................... 528/371; 528/372; 528/44; 525/461; 525/462; 525/465; 525/509; 525/519
[58] Field of Search ................... 528/367, 370, 528/372, 371, 732, 44; 525/509, 461, 462, 465, 509, 519

[56] References Cited

U.S. PATENT DOCUMENTS 4,533,729  8/1985  Newland et al. ................... 528/371

Primary Examiner—James J. Seidleck
Assistant Examiner—Duc Truong
Attorney, Agent, or Firm—Wenderoth, Lind & Ponack

[57] ABSTRACT

Disclosed is a coating composition comprising:

(1) a polycarbonate polyol having an average molecular weight of 400–10,000 and a hydroxyl value of 50–350, and (2) a melamine resin curing agent, wherein polyhydric alcohols constituting said polycarbonate polyol comprises at least 10 mol % of branched diols, at least 10 mol % of tri- or higher-hydric alcohols and the balance of the other polyhydric alcohols, and a ratio of component (1) / component (2) is within the range of 90/10-50/50 based on solid weight.

8 Claims, No Drawings

POLYFUNCTIONAL POLYCARBONATE POLYOL

FIELD OF THE INVENTION

The present invention is related to the coating composition, in particular the coating composition containing polyfunctional polycarbonate polyol.

BACKGROUND OF THE INVENTION

Polyols are widely used for paint, adhesive, elastomer etc. in combination with a curing agent which reacts with hydroxyl group. The polyols generally include polyether polyol such as polypropylene glycol and polytetramethylene glycol; polyester polyol obtained by reacting polyvalent carboxylic acid and polyhydric alcohol; polylactone polyol obtained by reacting lactone with alcohol; poly(meth)acrylate polyol obtained by polymerizing (meth)acrylate having a hydroxyl group such as 2-hydroxyethyl methacrylate. They are selectively used for various applications according to the required performances.

However, since polyether polyol has ether bonds, the paint film obtained using it has the drawback of being inferior in heat stability and weather stability. Also, since polyester polyol and polylactone polyol has ester bonds, the paint film obtained from them has the drawback of being inferior in water resistance. Further, poly(meth)acrylate polyol has good weather stability but it has the drawback of being poor in dynamic property.

In order to obtain the paint film free from such drawbacks, it is proposed to use polycarbonate polyol having carbonate bond in the molecular structure. For example, Japanese Kokai Publication 45522/1990 discloses a coating composition which comprises (1) a polycarbonate polyol obtained from a saturated aliphatic $\alpha,\omega$-glycol having 4 to 12 carbon atoms and tris-(hydroxyethyl)-isocyanurate and (2) a melamine resin or isocyanate curing agent.

However, since the saturated $\alpha,\omega$-glycol has high crystallinity, the obtained polycarbonate polyol has crystallinity. Consequently, the paint composition described in the aforesaid publication has poor solubility with usual solvent and poor compatibility with the curing agent. The inferior compatibility with curing agent causes poor curing ability and poor appearance of the paint film, and results in the decline of durability and physical property of the paint film.

SUMMARY OF THE INVENTION

The present invention solves the aforesaid conventional problems and the objective of the invention is to provide the coating composition which has good solubility in solvent, high compatibility with curing agent, preferred heat and water resistance and dynamic property and preferred physical property such as adhesive ability to other paint film and durability.

The present invention, thus, provides a coating composition which comprises:

(1) a polycarbonate polyol having an average molecular weight of 400–10,000 and a hydroxyl group value of 50–350, and (2) a melamine resin curing agent, wherein polyhydric alcohols constituting said polycarbonate polyol comprises at least 10 mol % of branched diols, at least 10 mol % of tri- or higher-hydric alcohols and the balance of the other polyhydric alcohols, and a ratio of component (1) / component (2) is within the range of 90/10-50/50 based on solid weight.

The present invention also provides a polycarbonate polyol which is very suitable for the above coating composition.

DETAILED DESCRIPTION OF THE INVENTION

The polyfunctional polycarbonate polyol contained in the coating composition of the present invention is obtained by reacting art-known polyhydric alcohols with a carbonyl component selected from the group consisting of phosgene, a chloroformate, a dialkylcarbonate, a diarylcarbonate, an alkylene carbonate and a mixture thereof. The process for producing the polycarbonate polyol is art known, for example U.S. Pat. Nos. 3,689,462, 4,533,729 and 3,689,609.

The polyfunctional polycarbonate polyol used in the present invention has at least 2, preferably at least 3 hydroxyl group in one molecule. The number of hydroxyl groups is counted in average. Use of polycarbonate wherein the average hydroxyl group number contained in one molecule is less than two is undesirable because of the decrease of crosslinking ability and the decrease of durability of the coated film.

The polycarbonate polyol used in the present invention has a number average molecular weight of 400 to 10,000, preferably 1,000 to 5,000. When the number average molecular weight is smaller than the above range, stickiness or softness remains in the cured film and thus physical properties of the coated film become inferior. If the number average molecular weight is larger than the above range, the viscosity of the polycarbonate polyol becomes too high and as the result the coating ability and smoothness of the paint film are deteriorated.

The polycarbonate polyol has a hydroxyl value of 50 to 350, preferably 100 to 310. When the hydroxyl value is less than the above range, crosslinking ability becomes too low and durability of the coated film decreases, while if it is larger than the above range, crosslinking ability becomes too high and the coated film becomes rigid and its physical properties deteriorate.

The polyhydric alcohol used in the present invention for preparation of the polyfunctional polycarbonate polyol is a mixture containing at least 10 mol %, preferably at least 25 mol % of the branched diols, at least 10 mol %, preferably 13 mol % of the tri- or higher-hydric alcohols and the balance of the other polyhydric alcohols. The tri- or higher-hydric alcohol is more preferably a 4–6 hydric alcohol.

By using the alcohol component which contains the branched diols, an amorphous polycarbonate polyol is obtained and as the result compatibility of the coating composition improves. By using the alcohol component which contains tri- or higher hydric alcohol, the hydroxyl value of the resulting polycarbonate polyol increases and thus curing property of the coated film improves.

When the content of the branched diols is less than 10 mol %, the resulting polyfunctional polycarbonate polyol crystallizes and its solvent solubility and compatibility with melamine resin is deteriorated. When the content of tri- or higher hydric alcohol is less than 10 mol %, functional group number of the resulting polycarbonate polyol decreases and sufficient curing property is not obtainable.

Typical examples of the branched diols used in the present invention are 2-methyl-1,3-propane diol, 3-methyl-1,5-pentane diol, neopentyl glycol, 2,2-diethyl-1,3-propanediol, 2-butyl-2-ethyl-1,3-propane diol, 2,2-diethyl-1,3-propane diol, 2-butyl-2-ethyl-1,3-propane diol, 2-methyl-1,8-octane diol, 2,2,4-trimethyl-1,3-pentane diol, 2-ethyl-1,3-hexane diol, 1,4-cyclohexane dimethanol, etc.

The tri- or higher-hydric alcohols used in the present invention include triols, such as glycerin, trimethylol ethane and trimethylol propane; tetraols, such as trimethylol propane dimer, pentaerythritol and 1,2,7,8-octane tetraol; pentaols, such as ribitol, arabitol and xylitol; hexaols such as sorbitol, allitol, mannitol, dulcitol, pentaerythritol dimer; and the like. When the tri- or higher hydric alcohols is sugaralcohols, they have optical isomers, all (D-isomer, L-isomer and DL-isomer) of which can be used for the present invention.

The balance of the polyhydric alcohol component can be the other polyhydric alcohols, for example straight chain diols such as 1,3-propylene glycol, 1,4-butane diol, 1,5-pentane diol, 1,6-hexane diol, 1,8-octane diol, 1,9-nonane diol and 1,10-decane diol, etc.

The polyfunctional polycarbonate polyol used in the present invention may have carboxyl group with less than 50 acid value. Particularly, in the case of the coating composition containing no curing catalyst for the melamine resin, such as p-toluenesulfonic acid or an alkyl-substituted naphthalenesulfonic acid, it is impossible to obtain a sufficiently cured film and therefore it is preferred to use the polycarbonate polyol having carboxyl groups of less than 50 acid value. When acid value is larger than 50, curing property is excellent but large amount of carboxyl group remains in the cured film and therefor water resistance of the film remarkably deteriorates.

The polycarbonate polyol containing such carboxyl groups is obtained by reacting the-polycarbonate polyol with an acid anhydride or a dicarboxylic acid at 120°–180 ° C. The acid anhydride to be used here may be phthalic anhydride, trimelitic anhydride, tetrahydro-phthalic anhydride, succinic anhydride and itaconic anhydride etc. and dicarboxylic acid may be adipic acid, sebacic acid, phthalic acid, isophthalic acid, etc.

The polycarbonate polyol of the present invention preferably has a carbonate portion (i.e. —O—CO—O—) of 20 to 40 % by weight, more preferably 22 to 34% by weight, by controlling the amount of the carbonyl component and the polyhydric alcohol component. If the content of the carbonate portion is less than 20% by weight, the cured film is soft and adhesiveness of the film also reduces. If it is more than 40% by weight, the polycarbonate polyol is too viscous and the resulting coated film has poor smoothness and very stiff.

The melamine resin used for the curing agent of the present invention may be the resin obtained by addition-condensation of an amine compound such as melamine, guanamine and urea with formaldehyde by art-known method or the resin obtained by further addition-condensation of such resin with alcohol. For instance, it may be methylated melamine, butylated melamine, methylated benzoguanamine, butylated henzoguanamine, etc.

A portion of the melamine resin, preferably 0 to 50% by weight of the melamine resin, can be replaced with an isocyanate compound. Examples of the isocyanate compounds are tolylene diisocyanate, diphenylmethane diisocyanate, xylylene diisocyanate, hexamethylene diisocyanate, isophorone diisocyanate, biuret thereof, isocyanulate thereof trimethylolpropane-adduct thereof, and the like.

The solid weight ratio of polycarbonate polyol (1) / melamine resin (2) is preferably within the range of 90/10 to 50/50. When the ratio of polycarbonate polyol and melamine resin is larger than the aforesaid range, sufficient curing property is not obtained, while if it is smaller than the above, crosslinking ability becomes too high, the coated film becomes too hard and physical properties of the coated film such as adhesive ability deteriorates.

The coating composition of the present invention may contain various polyol, various pigments, organic solvents, curing catalyst and various additives, if necessary.

Examples of the polyol are polyethers such as polypropylene glycol, polytetramethylene glycol; polyester polyols derived from polyhydric carboxylic acid and polyhydric alcohol; polylactone polyol obtained by the reaction of lactone and alcohol; poly(meth)acrylate polyol obtained by polymerization of (meth)acrylate containing a hydroxyl group.

The pigment useful for the coating composition of the present invention may be titanium oxide, silica, carbon black, molybdenum orange, copper phthalocyanine, quinacridone red, etc.

The curing catalyst to be used for the coating composition of the present invention may be p-toluenesulfonic acid, xylenesulfonic acid, dodecylbenzenesulfonic acid, didodecylnaphthalenesulfonic acid, didodecylnaphthalenesulfonic acid, dinonylnaphthalenesulfonic acid, dinonylnaphthalenedisulfonic acid, their amine blocks, phosphoric acid, etc.

In the present invention, an organic solvent may be used to adjust the viscosity of the coating composition to the condition preferred for coating workability. The concrete examples of such organic solvent may be xylene, toluene, ethyl acetate, butyl acetate, methylethyl ketone and methyl isobutyl ketone. These solvents are preferably used in the amount where solid content of paint becomes about 30–70 wt %.

Other additives to be used for the coating composition of the present invention may be surface active agent, antioxidant, UV ray absorbing agent, pigment dispersing agent and fluidity adjusting agent, etc.

EXAMPLES

The present invention is illustrated by the following Examples which, however, are not to be construed as limiting the present invention to their details.

Preparation Example 1

In a glass reactor vessel equipped with stirrer, thermometer and fractionating column, 1,000 wt parts (4.7 mol) of diphenyl carbonate, 232 wt parts (1.5 mol) of 2-methyl-1,8-octanediol, 432 wt parts (2.7 mol) of 1,9-nonane diol and 259 wt parts (1.0 mol) of trimethylolpropane dimer were mixed and the mixture was heated to 185° C. in nitrogen gas stream. While fractionating phenol from the reaction mixture, it was gradually heated to 220° C. and when most of phenol was fractionated, the residual phenol was completely removed under vacuum of 5–10 mmHg. As the result, a liquid polycarbonate polyol (I) with hydroxyl group number of 147 was obtained. Number average molecular weight of gel permeation chromatography (GPC) was 2,360 and average hydroxyl group number was 6.2.

Preparation Example 2

In a glass reactor vessel equipped with stirrer, thermometer and fractionation column, 1,000 wt parts (11.1mol) of dimethyl carbonate, 650 wt parts (5.5 mol) of 3-methyl-1,5-pentanediol and 1 wt part of tetraisopropyl titanate as catalyst were mixed and under normal pressure, the mixture was heated at 100° C. for 5 hours and thereafter the temperature was raised to 200° C. taking 5 hours and methanol produced by the reaction of dimethyl carbonate was fractionated.

After the end of fractionation of methanol, the mixture was reacted for 2 hrs. under reduced pressure, the produced methanol and excess dimethyl carbonate were thus fractionated and the reaction product was obtained. Proton NMR analysis of the reaction product indicated that it had methyl carbonate terminal and number average molecular weight by GPC was 6,840. When 99 wt parts (0.40 mol) of trimethylol propane dimer was added to 500 wt parts of thus obtained reaction product, and ester exchange reaction was conducted for 4 hrs. at 200° C., polycarbonate polyol (II) with hydroxyl group number of 154 was obtained. Number average molecular weight measured by GPC was 2,350 and average hydroxyl group number in one molecule was 6.5.

Preparation Example 3–9

Polycarbonate polyol (III)–(IX) was prepared in the same way as in Preparation Example 1 except that the composition ratio shown in Table 1 below was used. Table 2 indicates the mol ratio of the composition of its alcohol component and Table 3 indicates the characteristics of polycarbonate polyol obtained.

Preparation Example 10

36 weight parts of phthalic acid anhydride was added to 500 weight parts of polycarbonate polyol (I) obtained in Example 1 and the reaction was continued for 2 hrs. at 180° C. and polycarbonate polyol (X) with hydroxyl group number of 120 and acid value of 27 was obtained. Number average molecular weight measured by GPC was 2,580 and average hydroxyl group number in one molecule was 5.5. Table 2 shows the mol ratio of the composition of alcohol component and Table 3 shows the characteristics of polycarbonate polyol obtained.

Preparation Example 11

86 wt parts of phthalic acid anhydride was added to 500 wt parts of polycarbonate polyol (IV) obtained in Preparation Example 3 and the reaction was continued for 2 hrs. at 180° C. and polycarbonate polyol (XI) with hydroxyl group number of 112 and acid value of 61 was obtained. Number average molecular weight measured by GPC was 2,400 and average hydroxyl group number in one molecule was 4.8. Table 2 shows the mol ratio of the composition of its alcohol component and Table 3 shows the characteristics of polycarbonate polyol obtained.

Preparation Example 12

Polycarbonate polyol (XII) with hydroxyl group number of 105 was obtained in the same way as in Preparation Example 1, using 1,000 wt parts (4.7 mol) of diphenyl carbonate, 520 wt parts (4.4 mol) of 1,6-hexane diol and 365 wt parts (1.4 mol) of tris-hydroxyethyl isocyanurate. Number average molecular weight measured by GPC was 2,710 and average hydroxyl group number in one molecule was 5.1. Table 2 shows the mol ratio of the composition of its alcohol component and Table 3 shows the characteristics of polycarbonate polyol obtained.

TABLE 1

Formulation of Preparation Examples 3–9 (Wt parts)

| Preparation Ex. No. | Polycarbonate polyol No. | DPC[1] | 3MPD[2] | 2MPD[3] | BEPD[4] | CHDM[5] | HD[6] | ND[7] | D-TMP[8] | TMP[9] |
|---|---|---|---|---|---|---|---|---|---|---|
| 3 | III | 1,000 | 520 | — | — | — | — | — | 259 | — |
| 4 | IV | 1,000 | 393 | — | — | — | — | — | 500 | — |
| 5 | V | 1,000 | — | 370 | — | — | — | — | 230 | 46 |
| 6 | VI | 1,000 | — | — | 467 | 128 | — | — | 225 | — |
| 7 | VII | 1,000 | — | — | — | — | 1,109 | — | — | — |
| 8 | VIII | 1,000 | — | — | — | — | — | 747 | — | 134 |
| 9 | IX | 1,000 | 322 | — | — | — | — | — | 751 | — |

TABLE 2

Mol ratio of alcohol component in polycarbonate polyol

| Preparation Ex. No. | Polycarbonate polyol No. | Mol % of alcohol component | | |
|---|---|---|---|---|
| | | Branched diols | Strait chain diols | Tri- or higher alcohols |
| 1 | I | MOD[10]: 28.8 | ND: 51.9 | D-TMP: 19.3 |
| 2 | II | 3MPD: 89.4 | — | D-TMP: 10.6 |
| 3 | III | 3MPD: 81.5 | — | D-TMP: 18.5 |
| 4 | IV | 3MPD: 62.3 | — | D-TMP: 37.7 |
| 5 | V | 2MPD: 76.5 | — | D-TMP: 17.2 TMP: 6.3 |
| 6 | VI | BEPD: 62.0 CHDM: 18.8 | — | D-TMP: 19.2 |
| 7 | VII | — | HD: 100.0 | — |
| 8 | VIII | — | ND: 98.4 | TMP: 1.6 |
| 9 | IX | MPD: 48.2 | — | D-TMFY: 51.8 |
| 10 | X | MOD: 28.8 | ND: 51.9 | D-TMP: 19.3 |
| 11 | XI | MPD: 81.5 | — | D-TMP: 18.5 |

TABLE 2-continued

| | | Mol ratio of alcohol component in polycarbonate polyol | | |
|---|---|---|---|---|
| Preparation Ex. No. | Polycarbonate polyol No. | Mol % of alcohol component | | |
| | | Branched diols | Strait chain diols | Tri- or higher alcohols |
| 12 | XII | — | HD: 75.8 | THEI: 24.2 |

TABLE 3

| | | Charateristics of polycarbonate polyol | | | | |
|---|---|---|---|---|---|---|
| Preparation Ex. No. | Polycarbonate polyol | Molecular weight (Mn;GPC) | Hydroxyl value (mgKOH/g) | Acid value (mgKOH/g) | Number of Hydroxyl groups | Appearance |
| 1 | I | 2360 | 147 | — | 6.2 | Light yellow liquid |
| 2 | II | 2350 | 154 | — | 6.4 | Light yellow liquid |
| 3 | III | 2030 | 193 | — | 7.0 | Light yellow liquid |
| 4 | IV | 1500 | 310 | — | 8.3 | Light yellow liquid |
| 5 | V | 1940 | 159 | — | 5.5 | Light yellow liquid |
| 6 | VI | 2400 | 122 | — | 5.2 | Light yellow liquid |
| 7 | VII | 350 | 320 | — | 2.0 | White solid |
| 8 | VIII | 11300 | 15 | — | 3.0 | White solid |
| 9 | IX | 1250 | 388 | — | 8.6 | Light yellow liquid |
| 10 | X | 2580 | 120 | 27 | 5.5 | Light yellow liquid |
| 11 | XI | 2400 | 112 | 61 | 4.8 | Light yellow liquid |
| 12 | XII | 2710 | 105 | — | 5.1 | Yellow solid |

Symbols in Tables 1–3 respectively represent following compounds:

DPC: Diphenyl carbonate
3MPD: 3-Methyl-1,5-pentane diol
2MPD: 2-Methyl-1,3-propane diol
BEPD: 2-Butyl-2-ethyl-1,3-propane diol
CHDM: 1,4-Cyclohexanedimethanol
HD: 1,6-Hexane diol
ND: 1,9-Nonane diol
D-TMP: Dimer of trimethylolpropane
TMP: Trimethylolpropane
MOD: 2-Methyl-1,8-octane diol
THEI: Trishydroxyethyl isocyanurate Preparation Example 13

In a glass reactor vessel equipped with stirrer, thermometer and fractionation column, 1,000 wt parts (11.1mol) of dimethyl carbonate, 495 wt parts of 2-methyl-1,3-propanediol and 1 wt part of tetraisopropyl titanate as catalyst were mixed and under normal pressure, the mixture was heated at 100° C. for 5 hours and thereafter the temperature was raised to 200° C. taking 5 hours and methanol produced by the reaction of dimethyl carbonate was fractionated.

After the end of fractionation of methanol, the mixture was reacted for 2 hrs. under reduced pressure, the produced methanol and excess dimethyl carbonate were thus fractionated and the reaction product was obtained. Proton NMR analysis of the reaction product indicated that it had methyl carbonate terminal and number average molecular weight by GPC was 9,840. When 314 wt parts of trimethylol propane dimer was added to 500 wt parts of thus obtained reaction product, and ester exchange reaction was conducted for 4 hrs. at 200° C. to obtain a light yellow liquid polycarbonate polyol (XIII) with hydroxyl value of 189. Number average molecular weight measured by GPC was 1,940 and average hydroxyl group number in one molecule was 6.5. The resulting polycarbonate polyol XIII had a carbonate portion of 33.4% by weight and the other portion of 66.6% by weight.

Preparation Example 14

A polycarbonate polyol (XIV) was prepared as generally described in Preparation Example 13, with exception that 886 wt parts of 2-butyl-2-ethyl-1,3-propane diol was employ in stead of 2-methyl-1,3-propane diol and 250 wt parts of trimethylol propane dimer was employed. The resulting polycarbonate polyol XIV had a molecular weight of 2,400 and a hydroxyl value of 122, and average hydroxyl group number in one molecule was 5.2. It also had a carbonate portion of 25.5% by weight and the other portion of 74.5% by weight.

Preparation Example 15

A polycarbonate polyol (XV) was prepared as generally described in Preparation Example 13, with exception that 254 wt parts of pentaerythritol dimer was employed instead of trimethylol propane dimer and 650 wt parts of 3-methyl-1,5-pentane diol was employed instead of 2-methyl-1,3-propane diol. The resulting polycarbonate polyol XV had a molecular weight of 2,300 and a hydroxyl value of 245, and average hydroxyl group number in one molecule was 10.0. It also had a carbonate portion of 30.9% by weight and the other portion of 69.1% by weight.

Preparation Example 16

A polycarbonate polyol (XVI) was prepared as generally described in Preparation Example 13, with exception that 183 wt parts of sorbitol was employed instead of trimethylol propane dimer. The resulting polycarbonate polyol XIV had a molecular weight of 2,150 and a hydroxyl value of 250, and average hydroxyl group number in one molecule was 9.6. It also had a carbonate portion of 32.3% by weight and the other portion of 67.7% by weight.

EXAMPLE 1

70 wt parts of polycarbonate polyol (I) obtained in the Preparation Example 1, 50 wt parts of butylated melamine resin (Yuban 128 having a solid content of 60% by weight, manufactured by Mitsui Toatsu Chemical Co.) and 1 wt part of para-toluene sulfonic acid curing catalyst were mixed under stirring and the mixture was coated-on a steel panel for the thickness of 60 μ and baked for 25 minutes at 140° C. to obtain the cured film. Characteristics of the obtained paint and the cured film were evaluated as to the following items. The results are shown in Table 4.

Method of evaluation of the performance of paint and the coated film.

Property of paint: State of mixing of the paint was evaluated visually.

Smoothness: Smoothness of the cured film was evaluated visually.

Curing property: Curing condition of the coated film was evaluated by the stickiness of film checked by finger touch.

Solvent resistance: The coated film was rubbed by gauze soaked with xylene for 50 reciprocating rounds and defects of the coated film was evaluated visually.

Impact resistance: DuPont test: ½φ×500 g×30 cm

Water resistance: The coated film was immersed in water at 40° C. for 480 hrs., the coated film was given scar in grating form (100 squares of 1 mm/mm), an adhesive tape was applied on it and the tape was peeled off. Water resistance was indicated by the number of grating squares left on the surface.

EXAMPLE 2–6

Cured film was obtained in the same way as in Example 1 except that polycarbonate polyol (II)-(VI) obtained in the Preparation Example 2–6 were respectively used instead of polycarbonate polyol (I). Various characteristics of the obtained paint and the cured film were evaluated. The results are shown in Table 4.

EXAMPLE 7

70 wt parts of polycarbonate polyol (X) obtained in the Preparation Example 10 and 50 wt parts of butylated melamine resin (Yuban 128, manufactured by Mitsui Toatsu Chemical Co.) were mixed under stirring and the mixture was coated on a steel panel for the thickness of 60 μ and baked at 140° C. for 25 minutes to obtain the cured the coated film. Various characteristics of the obtained paint and the cured film were evaluated. The results are shown in Table 4.

EXAMPLES 6 TO 9

70 wt parts of polycarbonate polyol (XIII) to (XV) obtained in Preparation Example 13–15, 30 wt parts of butylated melamine resin (Yuban 128, manufactured by Mitsui Toatsu Chemical Co.) and 1 wt part of p-toluenesulfonic acid curing catalyst were mixed under stirring and the mixture was coated on a steel panel for the thickness of 60 μ and baked for 25 minutes at 140° C. to obtain a cured film. Characteristics of the obtained paint and the cured film were evaluated, and the results are shown in Table 4.

EXAMPLE 11

70 wt parts of polycarbonate polyol (XVI) obtained in Preparation Example 16, 30 wt parts of butylated melamine resin (Yuban 128, manufactured by Mitsui Toatsu Chemical Co.), 1 wt part of p-toluenesulfonic acid curing agent and 16 wt parts of an isocyanulate of hexamethylene diisocyante (avialable from Nippon Polyurethane K.K. as Colonate EX: NCO equivalent =197, solid content =75 wt %) were mixed under stirring and the mixture was coated on a steel panel at a thickness of 60 μ and baked at 140° C. for 25 minutes to obtain a cured film. The same evaluations were conducted and the results are shown in Table 4.

Comparative Example 1 and 2

Cured the coated film was obtained in the same way as in Example 1 except that polycarbonate polyol (VII)–(VIII) obtained in Preparation Example 7–8 were used and xylene was used as solvent for the amount that the solid contents occupy 70 wt % of the total. Various characteristics of thus obtained paint and cured the coated film were evaluated. The results are shown in Table 4.

Comparative example 3

Cured the coated film was obtained in the same way as in Example 1 except that polycarbonate polyol (IX) obtained in the Preparation Example 9 was used instead, of polycarbonate polyol (I). Various characteristics of thus obtained cured the coated film were evaluated. The results are shown in Table 4.

Comparative example 4

Cured the coated film was obtained in the same way as in Example 1 except that polycarbonate polyol (XI) obtained in Preparation Example 11 was used instead of polycarbonate polyol (I). Various characteristics of thus obtained paint and cured the coated film were evaluated. The results are shown in Table 4.

Comparative example 5

Cured the coated film was obtained in the same way as in Example 1 except that polycarbonate polyol (XII) obtained in Preparation Example 12 was used instead of polycarbonate polyol (I). Various characteristics of thus obtained paint and the coated film were evaluated. The results are shown in Table 4.

TABLE 4

| Ex. No. | Polycarbonate No. | Evaluation of cured film | | | | | |
|---|---|---|---|---|---|---|---|
| | | Appearance | Smoothness | Curing ability | Sovent resistance | Impact resistance | Water resistance |
| 1 | I | Clear | Smooth | Good | Good | Good | 100/100 |
| 2 | II | Clear | Smooth | Good | Good | Good | 100/100 |
| 3 | III | Clear | Smooth | Good | Good | Good | 100/100 |
| 4 | IV | Clear | Smooth | Good | Good | Good | 100/100 |
| 5 | V | Clear | Smooth | Good | Good | Good | 100/100 |
| 6 | VI | Clear | Smooth | Good | Good | Good | 100/100 |
| 7 | X | Clear | Smooth | Good | Good | Good | 100/100 |
| 8 | XIII | Clear | Smooth | Good | Good | Good | 100/100 |
| 9 | XIV | Clear | Smooth | Good | Good | Good | 100/100 |
| 10 | XV | Clear | Smooth | Good | Good | Good | 100/100 |
| 11 | XVI | Clear | Smooth | Good | Good | Good | 100/100 |
| Comp. Ex. 1 | VII | Cloudy | Smooth | Poor | Dissolved | — | 0/100 |
| Comp Ex. 2 | VIII | Paste | Round | Fairly good | Swelled | Good | 80/100 |
| Comp. Ex. 3 | IX | Clear | Smooth | Good | Good | Cracks | 100/100 |
| Comp. Ex. 4 | XI | Clear | Smooth | Good | Good | Good | 0/100 |
| Comp. Ex. 5 | XII | Cloudy | Round | Good | Swelled | Cracks | 85/100 |

What is claimed is:

1. A coating composition comprising:
   (1) a polycarbonate polyol having a number average molecular weight of 400–10,000 and a hydroxyl value of 50–350, and
   (2) a melamine resin curing agent, wherein polyhydric alcohols constituting said polycarbonate polyol consist essentially of
   10 to 90 mol % branched diols and
   10 to 90 mol % tri- or higher-hydric alcohols, which tri- or higher hydric alcohols are selected from the group consisting of glycerin, trimethylolethane, trimethylolpropane, trimethylol propane dimer, 1,2,7,8-octane tetraol, ribitol, arabitol, xylitol, sorbitol, allitol, mannitol, dulcitol, pentaerythritol dimer and mixtures thereof, and
   wherein the ratio of component (1) /component (2) is within the range of 90/10-50/50 based on solid weight.

2. The coating composition according to claim 1 wherein said polycarbonate polyol is prepared by reacting said polyhydric alcohols with a carbonyl component selected from the group consisting of phosgene, a chloroformate, a dialkylcarbonate, a diarylcarbonate, an alkylene carbonate and a mixture thereof.

3. The coating composition according to claim 1 wherein said polycarbonate polyol has at least 2 hydroxyl groups in one molecule.

4. The coating composition according to claim 1 wherein said branched diols are selected from the group consisting of 2-methyl-1,3-propane diol, 3-methyl-1,5-pentane diol, neopentyl glycol, 2,2-diethyl-1,3-propanediol, 2-butyl-2-ethyl-1,3-propane diol, 2,2-diethyl-1,3-propane diol, 2-butyl-2-ethyl-1,3-propane diol, 2-methyl-1,8-octane diol, 2,2,4-trimethyl-1,3-pentane diol, 2-ethyl-1,3-hexane diol, 1,4-cyclohexane dimethanol and a mixture thereof.

5. The coating composition according to claim 1 wherein said other alcohols are selected from the group consisting of 1,3-propylene glycol, 1,4-butane diol, 1,5-pentane diol, 1,6-hexane diol, 1,8-octane diol, 1,9-nonane diol and 1,10-decane diol and mixtures thereof.

6. The coating composition according to claim 1 wherein said polyfunctional polycarbonate polyol has carboxyl group with less than 50 acid value.

7. The coating composition according to claim 1 wherein said polycarbonate polyol has a carbonate portion (i.e. —O—CO—O—) of 20 to 40% by weight.

8. The coating composition according to claim 1 wherein a portion of said melamine resin is replaced with an isocyanate compound in an amount of up to 50 wt %.

* * * * *